United States Patent
Kim et al.

(10) Patent No.: US 12,068,681 B2
(45) Date of Patent: Aug. 20, 2024

(54) DISPLAY DEVICE AND METHOD FOR CONTROLLING DISPLAY DEVICE

(71) Applicant: SAMSUNG ELECTRONICS CO., LTD., Suwon-si (KR)

(72) Inventors: Moonyoung Kim, Suwon-si (KR); Jeongil Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/885,051

(22) Filed: Aug. 10, 2022

(65) Prior Publication Data

US 2022/0385172 A1 Dec. 1, 2022

Related U.S. Application Data

(63) Continuation of application No. PCT/KR2021/095020, filed on Jan. 20, 2021.

(30) Foreign Application Priority Data

Feb. 20, 2020 (KR) .......................... 10-2020-0021106

(51) Int. Cl.
*H02M 1/42* (2007.01)
*G09G 1/00* (2006.01)
*H02M 1/00* (2007.01)

(52) U.S. Cl.
CPC .......... *H02M 1/4208* (2013.01); *G09G 1/005* (2013.01); *H02M 1/0032* (2021.05); *G09G 2330/021* (2013.01)

(58) Field of Classification Search
CPC ..... G06F 1/26; Y02B 70/10; G09G 2330/028; G09G 2330/021; G09G 1/005; H04N 5/63
See application file for complete search history.

(56) References Cited

U.S. PATENT DOCUMENTS

| 10,757,283 B2 * | 8/2020 | Hashimoto ........ H04N 1/00904 |
| 2012/0075359 A1 | 3/2012 | Kwak et al. |
| 2013/0169517 A1 | 7/2013 | Cho et al. |

(Continued)

FOREIGN PATENT DOCUMENTS

| JP | 2012-152105 A | 8/2012 |
| JP | 2013-69649 A | 4/2013 |

(Continued)

OTHER PUBLICATIONS

International Search Report (PCT/ISA/210) issued May 21, 2021 by the International Searching Authority in International Application No. PCT/KR2021/095020.

(Continued)

*Primary Examiner* — Nitin Patel
*Assistant Examiner* — Amen W Bogale
(74) *Attorney, Agent, or Firm* — Sughrue Mion, PLLC

(57) ABSTRACT

A display device includes a diode bridge configured to rectify input power; a power factor correction (PFC) circuit configured to control a power factor of the input power rectified by the diode bridge; a direct current (DC)/DC converter configured to change voltage of the input power received through the PFC circuit; and a PFC controller connected to the diode bridge and configured to selectively turn on or off the PFC circuit based on terminal voltages of lower diodes included in the diode bridge.

16 Claims, 16 Drawing Sheets

(56) References Cited

U.S. PATENT DOCUMENTS

| | | | | |
|---|---|---|---|---|
| 2016/0218624 A1* | 7/2016 | Ishizeki | .............. | H02M 1/4225 |
| 2017/0229051 A1* | 8/2017 | Cai | ........................ | G09G 3/006 |
| 2017/0329380 A1* | 11/2017 | Hung | .................. | H02M 1/4225 |
| 2018/0131830 A1* | 5/2018 | Hashimoto | ........ | H04N 1/00891 |
| 2020/0042071 A1 | 2/2020 | Jang et al. | | |
| 2020/0204065 A1* | 6/2020 | Masuda | .............. | H02M 1/4225 |

FOREIGN PATENT DOCUMENTS

| | | |
|---|---|---|
| KR | 10-2013-0076669 A | 7/2013 |
| KR | 10-2013-0084199 A | 7/2013 |
| KR | 10-1422024 B1 | 7/2014 |
| KR | 10-2018-0089094 A | 8/2018 |
| KR | 10-1956165 B1 | 3/2019 |
| KR | 10-2019-0064828 A | 6/2019 |

OTHER PUBLICATIONS

Office Action issued on May 21, 2024 by Korean Patent Office in corresponding Korean Patent Application No. 10-2020-0021106.

* cited by examiner

2b

200  FIG. 14A
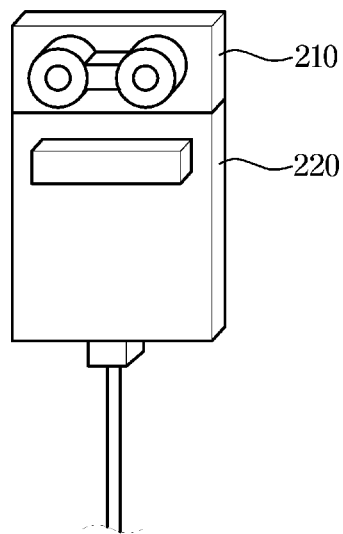
200  FIG. 14B
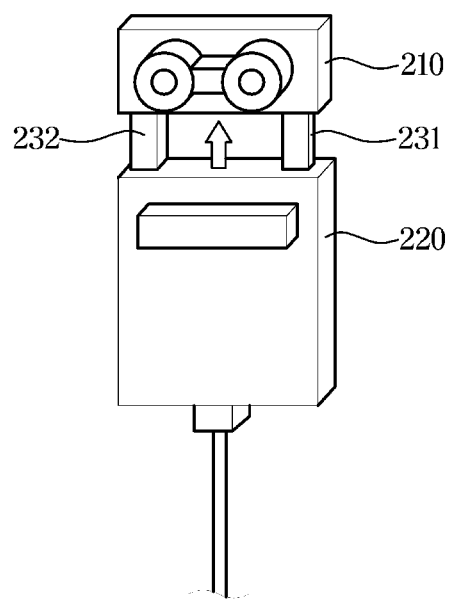

200 FIG. 15A
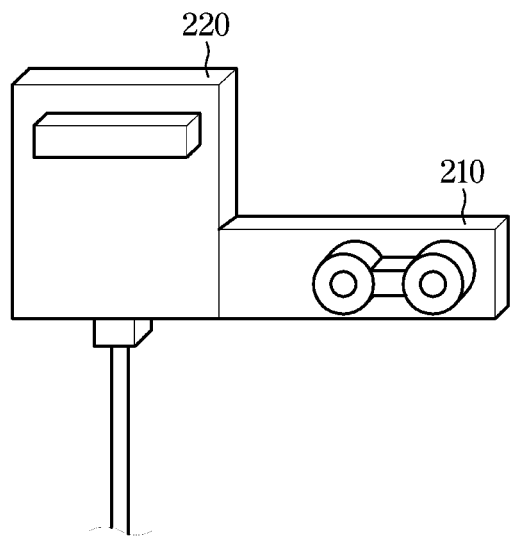
200 FIG. 15B
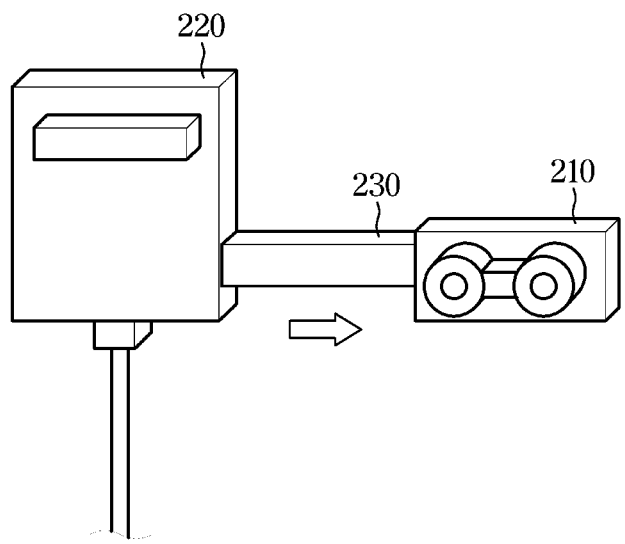

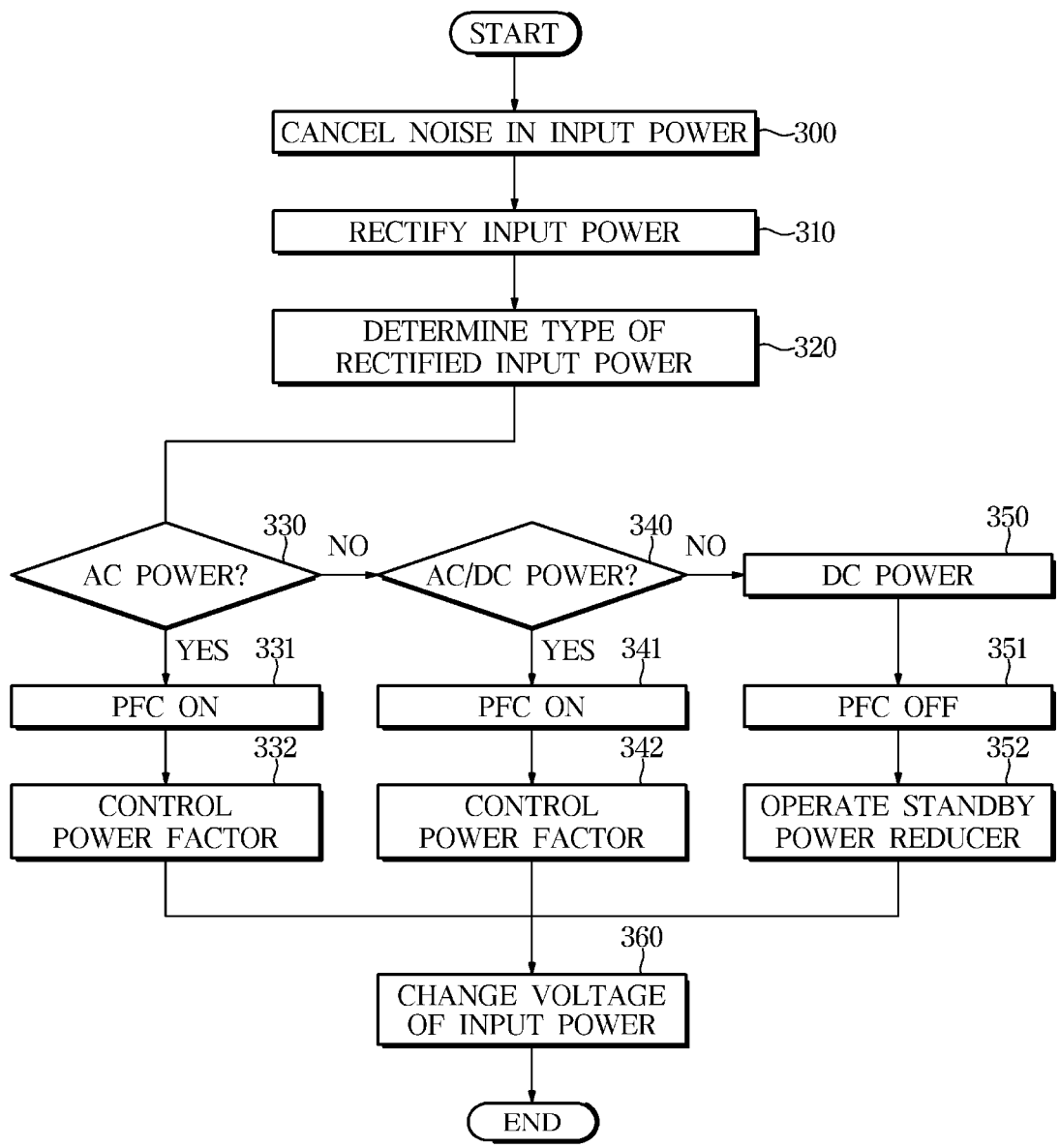

DISPLAY DEVICE AND METHOD FOR CONTROLLING DISPLAY DEVICE

CROSS-REFERENCE TO RELATED APPLICATION(S)

This application is a continuation of International Application No. PCT/2021/095020, filed on Jan. 20, 2021, which is based on and claims priority to Korean Patent Application No. 10-2020-0021106, filed on Feb. 20, 2020, in the Korean Intellectual Property Office, the disclosures of which are incorporated by reference herein in their entireties.

BACKGROUND

1. Field

The disclosure relates to a display device allowing a power board that receives alternate current (AC) power to use direct current (DC) input, and method for controlling the display device.

2. Description of Related Art

Generally, display devices receive power from an alternate current (AC) power source having a frequency from 50 Hz to 60 Hz. The display device converts input power to a direct current (DC) power to receive power required for an operation and supply the power to necessary components in an electronic device.

In the AC-to-DC power conversion process, the display device receives regulations to satisfy a power factor of 0.9 or more, and more than 75 W electronic devices need to include a power factor correction (PFC) circuit. When DC power is applied to the display device including the PFC circuit for satisfying the regulations, the entire power conversion process becomes long and the system efficiency decreases.

SUMMARY

Provided are a display device and method for controlling the display device, which may reduce power consumption and facilitates power efficiency by controlling a power factor correction (PFC) circuit to be turned on or off based on a type of input power.

According to an aspect of the disclosure, a display device includes: a diode bridge configured to rectify input power; a power factor correction (PFC) circuit configured to control a power factor of the input power rectified by the diode bridge; a direct current (DC)/DC converter configured to change voltage of the input power received through the PFC circuit; and a PFC controller connected to the diode bridge and configured to selectively turn on or off the PFC circuit based on terminal voltages of diodes included in the diode bridge.

The PFC controller may be further configured to identify a type of the input power based on a change in the terminal voltages of the diodes included in the diode bridge.

The PFC controller may be further configured to: identify that the input power is alternate current (AC) power based on the change in the terminal voltages of the diodes included in the diode bridge, and identify that the input power is DC power in response to no change in the terminal voltages of the diodes included in the diode bridge.

The PFC controller may include: first and second comparators configured to compare the terminal voltages of the diodes included in the diode bridge with a first reference voltage; an OR gate configured to output a result of a logical OR operation of outputs of the first and second comparators; and a flip-flop configured to output a signal to selectively turn on or off the PFC circuit based on a change in the result output by the OR gate.

The PFC controller may further include a third comparator configured to generate a clock signal based on the input power based on the change in the result output by the OR gate, and the flip-flop may be further configured to output the signal to turn on or off the PFC circuit based on the clock signal.

The display device may further include at least two negative temperature coefficient of resistance (NTC) sensors provided between the diode bridge and the PFC controller.

The PFC controller may be further configured to identify a type of the input power based on a detection value of the NTC sensors.

The input power may include at least one of AC power, DC power, or AC/DC power, and the PFC controller may be further configured to turn on the PFC circuit based on at least one of the AC power or the AC/DC power.

The PFC controller may be further configured to turn off the PFC circuit based on the DC power.

The display device may further include a standby power reducer including a switch configured to eliminate impedance contained in the PFC circuit, and to be controlled by the PFC controller.

The PFC controller may be further configured to generate a signal to turn off the PFC circuit and to operate the standby power reducer based on the signal.

According to an aspect of the disclosure, a method of controlling a display device, including a diode bridge and a power factor correction (PFC) circuit for controlling a power factor of input power rectified by the diode bridge, includes: rectifying, by the diode bridge, the input power; identifying a type of the input power rectified by the diode bridge; and controlling the PFC circuit to be selectively turned on or off based on the type of the input power.

The controlling the PFC circuit may include turning on the PFC circuit based on the input power including at least one of AC power or AC/DC power.

The controlling the PFC circuit may include turning off the PFC circuit based on the input power corresponding to DC power.

The display device may further include a standby power reducer including a switch configure to eliminate impedance contained in the PFC circuit.

The controlling the PFC circuit may include controlling the standby power reducer based on the type of the input power.

The controlling the PFC circuit may further include generating a signal to turn off the PFC circuit and operating the standby power reducer based on the signal.

The identifying the type of the input power may include identifying the type of the input power based on a detection value of at least two negative temperature coefficient of resistance (NTC) sensors provided between the diode bridge and the PFC controller.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13A, FIG. 13B, FIG. 14A, FIG. 14B, FIG. 15A and FIG. 15B are diagrams for describing various embodiments in which a switching connector may be implemented; and FIG. 16 is a flowchart of a method of controlling a display device according to an embodiment.

DETAILED DESCRIPTION

Figure 1:
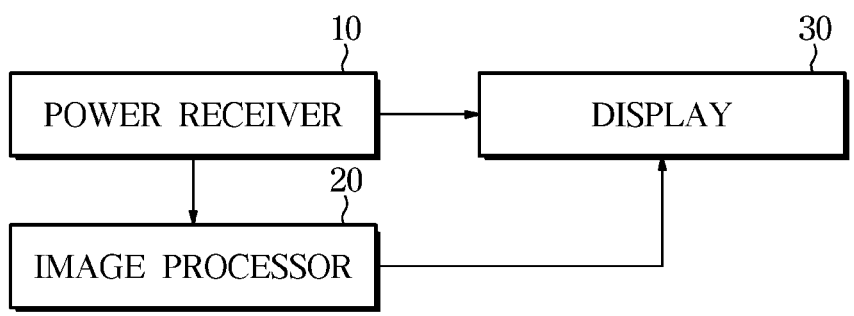
FIG. 1 is a control block diagram of a display device, according to an embodiment.

Like numerals refer to like elements throughout the specification. Not all elements of embodiments of the disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "— parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is described that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present invention will now be described with reference to accompanying drawings.

Figure 2:
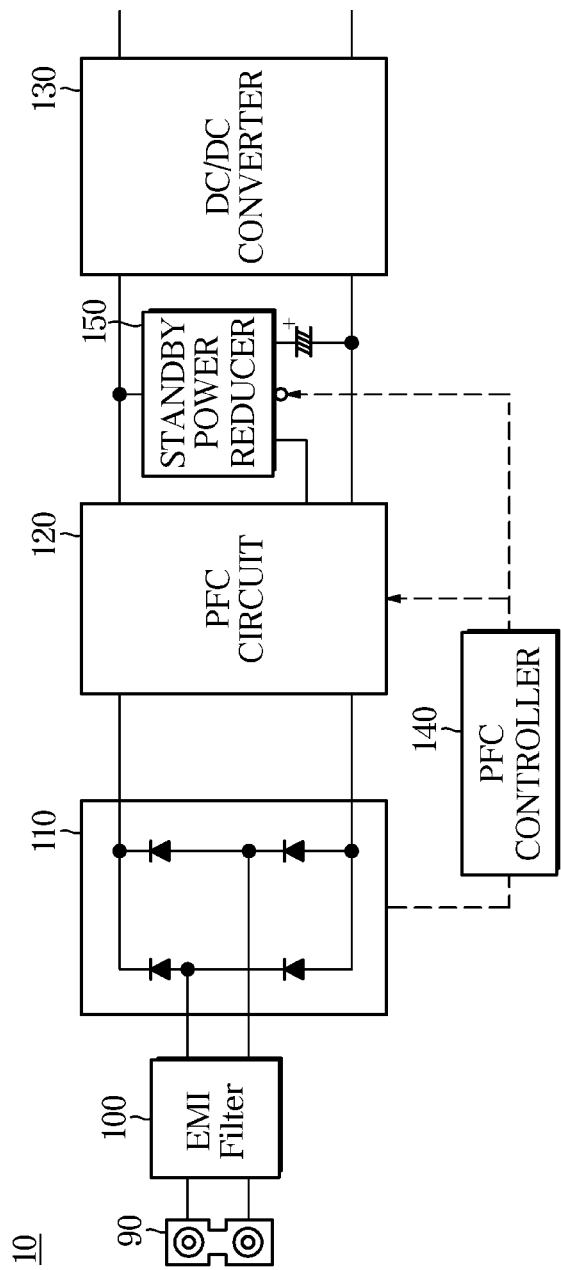
FIG. 2 illustrates a power receiver of a display device, according to an embodiment.

FIG. 1 is a control block diagram of a display device, according to an embodiment. FIG. 2 illustrates a power receiver of a display device, according to an embodiment. FIGS. 1 and 2 will now be described collectively to avoid overlapping explanation.

A display device 1 is a device that is able to visually present a processed image by processing a content signal received from the outside. In the following description, the display device 1 is illustrated as a large format display (LFD) that receives an image signal through a source device 2 (see FIG. 8) and displays the image signal, but is not limited thereto. For example, the display device 1 may be implemented in various forms, such as a wall-mounted type display, a module type display, a digital cinema, a digital signage or digital information display, etc.

The display device 1 may receive video and audio signals from the source device 2, and output video and audio corresponding to the video and audio signals. Besides, the display device 1 may receive television (TV) broadcast content through a broadcast receiving antenna or a cable, receive content from a content reproducing device, or receive content from a content providing source of a content provider.

Referring to FIGS. 1 and 2, the display device 1 may include a power receiver 10 for receiving input power and converting the input power to direct current (DC) power required for respective components arranged in the display device 1, an image processor 20 for processing image data from the outside or image data stored, and a display 30 for displaying the image-processed data.

The power receiver 10 receives power from an external input power source and supplies necessary power to the image processor 20 and the display 30. Specifically, the power receiver 10 may include an input connector 90 (see FIG. 2) to which an AC cord, an AC cord switching adapter, or a switching connector 200 (see FIG. 12) may be inserted, an electromagnetic interference (EMI) filter 100 for eliminating noise in input power, a diode bridge 110 (see FIG. 2) for performing full-wave rectification on the input power, a power factor correction (PFC) circuit 120 (see FIG. 2) for changing to DC power to fit a power factor (PF) of full-wave rectified voltage, and a DC/DC converter 130 (see FIG. 2) for changing the voltage into a form required by the image processor 20 and the display 30.

Furthermore, the power receiver 10 further includes a PFC controller 140 (see FIG. 2) connected to the diode bridge 110 and configured to selectively turn on or off the PFC circuit 120 based on the type of the input power rectified by the diode bridge 110, and a standby power reducer 150 for eliminating impedance contained in the PFC circuit 120 under the control of the PFC controller 140.

The EMI filter 100 may include a capacitor, an inductor and a reactor to cancel noise from commercial power.

The input power with the noise canceled therefrom by the EMI filter 100 undergoes full-wave rectification in the diode bridge 110. For example, when AC power is applied as the input power, the diode bridge 110 converts the AC power to DC power. The diode bridge 110 may include four diodes as shown in FIG. 2, which makes it possible to enable normal full-wave rectification regardless of voltage polarity of the AC power. As will be described below, even when receiving DC power (hereinafter, AC/DC power) having one-sided polarity for the AC power, the power receiver 10 as disclosed is able to rectify the AC/DC power to normally fit the voltage polarity regardless of +/− direction.

The PFC circuit 120 is included to satisfy a regulation that has to meet a power factor of 0.9 or more. The display device 1 using input power of 75 W or higher is sure to include a PFC circuit. In the embodiment, the PFC circuit 120 may include all of various circuits that satisfy the regulation and control the power factor.

In the meantime, the display device 1 may receive all of the DC power and AC/DC power in addition to the AC power. When the DC power is input, there is no need to operate the PFC circuit 120, or otherwise when the PFC circuit 120 is operated even with the DC power applied, the whole power conversion level increases and system efficiency decreases. Hence, the display device 1 in the disclosure further includes a PFC controller 140 for determining a type of the input power rectified by the diode bridge 110 and controlling the PFC circuit 120 to be turned on or off based on the type of the input power.

Figure 3:
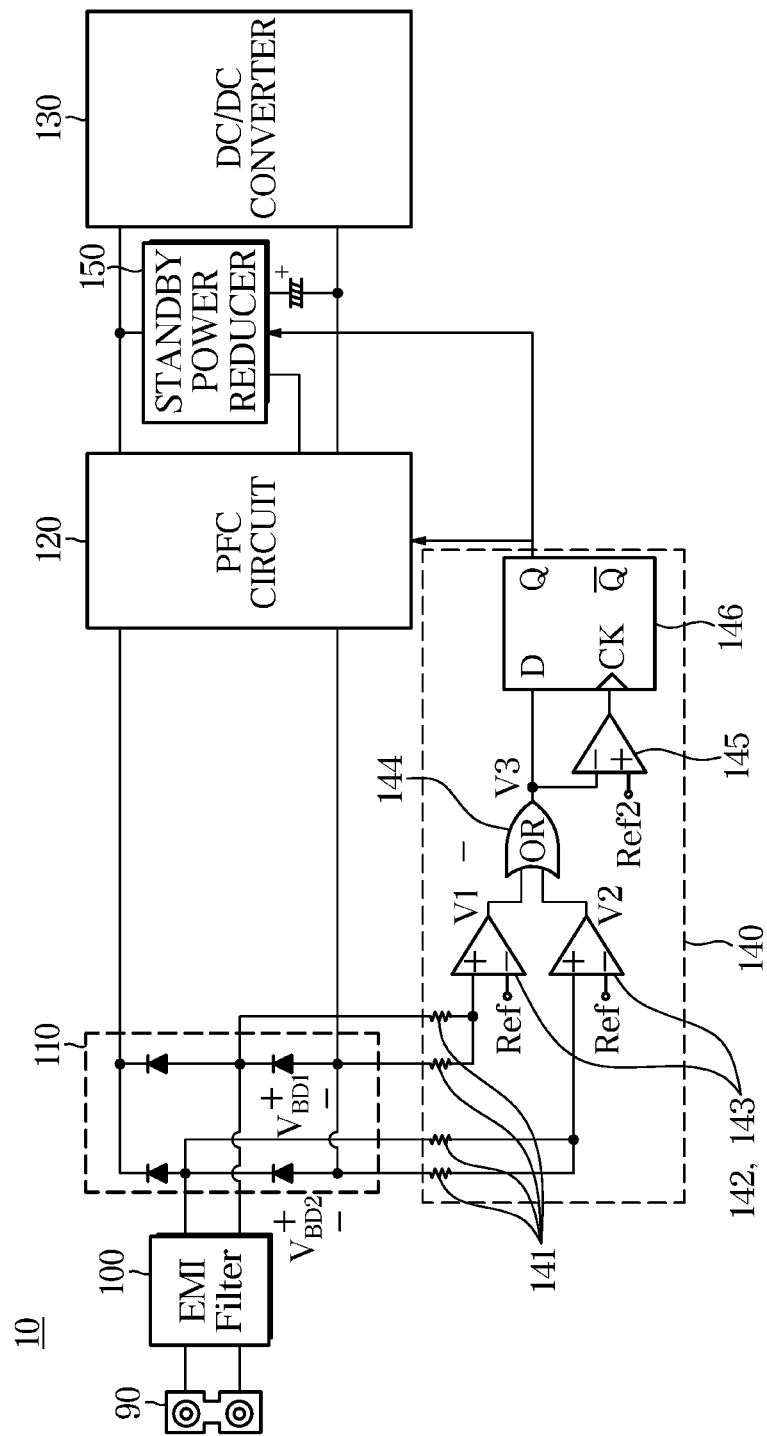
FIGS. 3, 4, and 5 are diagrams for describing configurations and operations of a PFC controller, according to an embodiment.

When the AC power and the AC/DC power are input, the PFC controller 140 turns on the PFC circuit 120. When the DC power is input, the PFC controller 140 turns on the PFC circuit 120. The PFC controller 140 may be comprised of a micro controller unit (MCU) including a processor. Alternatively, the PFC controller 140 may include an analog circuit as shown in FIG. 3 to generate on or off signal to the PFC circuit 120 based on the input power.

The PFC controller 140 controls the standby power reducer 150. Even when the DC power is applied and the PFC circuit 120 is turned off, circuits for normal PFC operation (a sensing circuit, an output capacitor, etc.) of the PFC circuit 120 may consume extra power. The standby power reducer 150 serves to eliminate impedance contained in the PFC circuit 120 to reduce power consumed additionally even when the PFC circuit 120 is operated in a standby mode. The standby power reducer 150 will be described later in detail in connection with FIG. 6.

The DC/DC converter 130 may convert a DC voltage to have a designated gain. When the PFC circuit 120 is turned off, the DC/DC converter 130 may convert the DC power output from the diode bridge 110 to have a designated gain. When the PFC circuit 120 is turned on, a DC voltage with a power factor corrected by the PFC circuit 120 may be converted to have the designated gain. As shown in FIG. 1, the DC/DC converter 130 may output the converted voltage to the image processor 20 or the display 30.

The image processor 20 receives an image signal from outside of the display device 1. Specifically, the image processor 20 may also receive an image signal from a source device 2 through the switching connector 200. The image processor 20 may perform image processing such as demultiplexing that separates a transmission stream included in the image signal into lower streams of an image signal, an audio signal, and extra data, de-interlacing that converts an interlaced image signal into a progressive type, scaling that adjusts a resolution of the image signal, noise reduction for image quality enhancement, detail enhancement, frame refresh rate conversion, etc.

A frame processed by the image processor 20 is displayed through the display 30. The display 30 may include a display panel for visually presenting an image and a display driver 31 (see FIG. 8) for driving the display panel.

The display panel may include pixels, each pixel being an element of a displayed image. Each pixel may receive an electric signal representing an image from the display driver, and output an optical signal corresponding to the received electric signal. By combining optical signals output by a plurality of pixels, an image may be displayed on the display panel.

The display panel may be implemented by various types of panels such as a liquid crystal display panel (LCD panel), a light emitting diode panel (LED panel), an organic light emitting diode panel (OLED panel), etc.

The display device 1 may further include other various components than the aforementioned components. For example, the display device 1 may include an audio amp for amplifying sound based on a sound signal received along with an image signal, a speaker for audibly outputting the amplified sound, and a sound module including a microphone that collects surrounding sound. Furthermore, the display device 1 may further include a processor for generally controlling the components of the display device 1, and a memory for storing data or a program required for operations of the processor.

Figure 4:
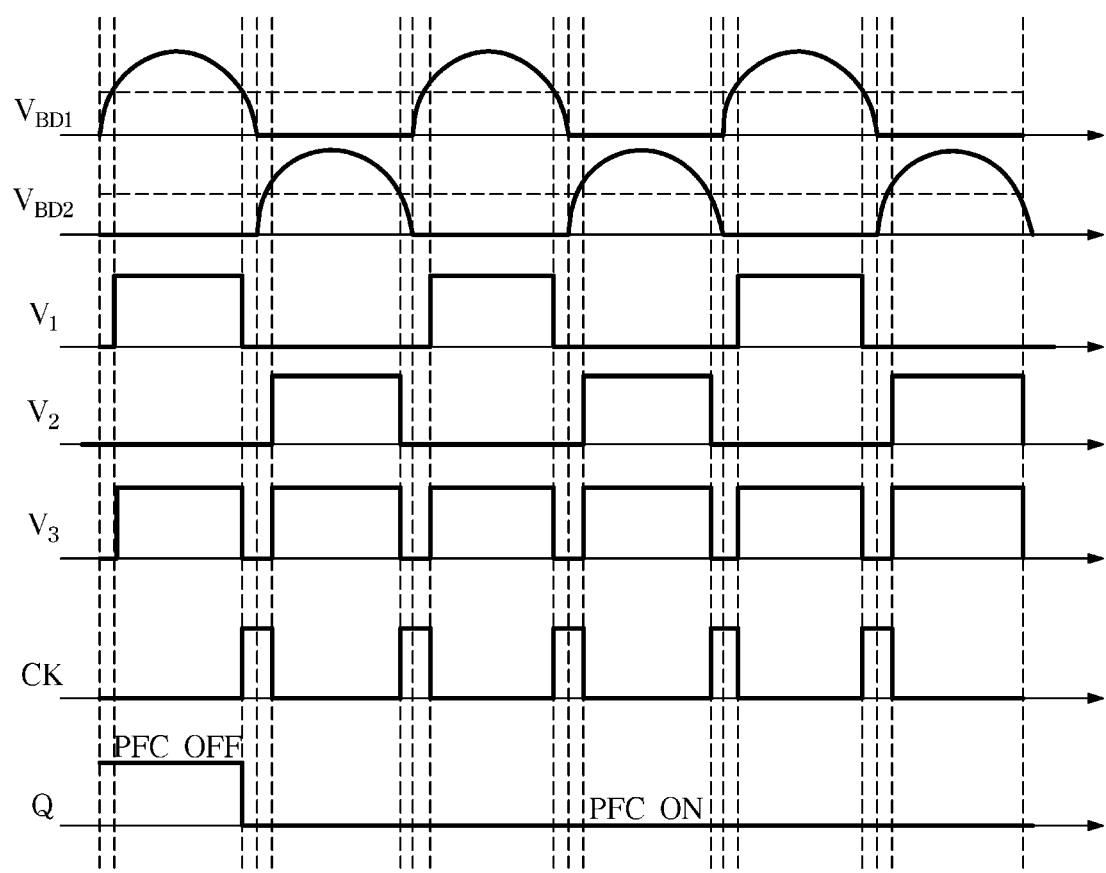
Figure 5:
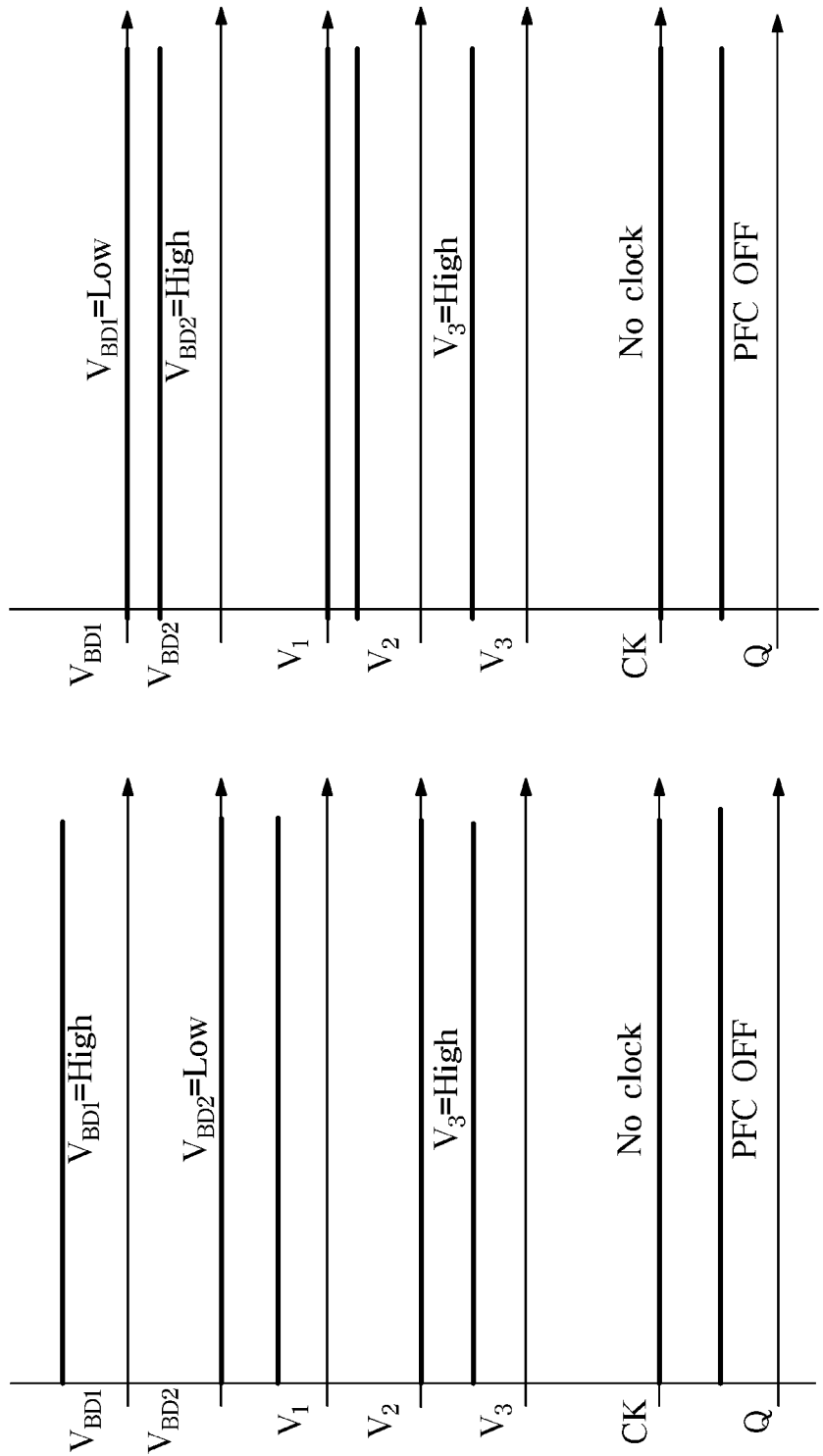

FIGS. 3, 4, and 5 are diagrams for describing configurations and operations of a PFC controller, according to an embodiment. FIGS. 3, 4, and 5 will now be described collectively to avoid overlapping explanation.

As described above in connection with FIG. 2, the PFC controller 140 may be comprised of a processor such as an MCU to control the PFC circuit 120, or alternatively, may be comprised of an analog circuit as shown in FIG. 3 to generate on or off signal.

Referring to FIG. 3, in an embodiment, the PFC controller 140 may be provided as an analog circuit including logic circuits comprised of a plurality of resistors 141, a plurality of comparators 142, 143 and 145, and a flip-flop 146

The PFC controller 140 is connected to the diode bridge 110. The PFC controller 140 generates a signal V1 and a signal V2 through the first and second comparators 142 and 143 based on terminal voltages $V_{BD1}$ and $V_{BD2}$ of lower diodes included in the diode bridge 110. Based on signal V3 generated through an OR gate 144, the PFC controller 140 generates a clock signal through the third comparator 145 and the flip-flop 146. The PFC controller 140 may generate a control signal to turn on or off the PFC circuit 120 based on the generated clock signal.

For example, the input power may be AC power. When the AC power is applied, the first terminal voltage $V_{BD1}$ of a first diode and the second terminal voltage $V_{BD2}$ of a second diode included in the diode bridge 110 have waveforms in the shape of substantially half-wave rectified sine waves as in FIG. 4. In this case, the first terminal voltage $V_{BD1}$ and the second terminal voltage $V_{BD2}$ may be scaled down by a voltage divider including the plurality of resistors 141. For example, the first terminal voltage $V_{BD1}$ and the second terminal voltage $V_{BD2}$ may be scaled down to maximum 5 V or 3.3 V.

The first terminal voltage $V_{BD1}$ and the second terminal voltage $V_{BD2}$ in the shape of substantially half-wave rectified sine waves are applied to the first comparator 142 and the second comparator 143, respectively. In the first comparator 142, the first terminal voltage $V_{BD1}$ may be compared with a first reference voltage Ref. The first reference voltage Ref may be a reference to determine whether the first terminal voltage $V_{BD1}$ and the second terminal voltage $V_{BD2}$ are high or low, and may be almost half of the maximum value of the first terminal voltage $V_{BD1}$ and the second terminal voltage $V_{BD2}$. For example, when the maximum value of the first terminal voltage $V_{BD1}$ and the second terminal voltage $V_{BD2}$ is 5 V, the first reference voltage Ref may be about 2.5 V. Furthermore, when the maximum value of the first terminal voltage $V_{BD1}$ and the second terminal voltage $V_{BD2}$ is 3.3 V, the first reference voltage Ref may be about 1.65 V.

As such, when the first terminal voltage $V_{BD1}$ and the second terminal voltage $V_{BD2}$ in the shape of substantially half-wave rectified sine waves are applied to the first comparator 142 and the second comparator 143, respectively, square waves having the same waveforms as the signals V1 and V2 are generated.

These signals V1 and V2 pass the OR gate 144 and have square waves such as the signal V3. The signal V3 is applied to the third comparator 145. In the third comparator 145, the signal V3 may be compared with a second reference voltage Ref2. The second reference voltage Ref2 may be a reference to determine whether the signal V3 is high or low and may be about half of a maximum value of the signal V3. Especially, the signal V3 may be input to a negative input terminal (−) of the third comparator 145, and the second reference voltage Ref2 may be input to a positive input terminal (+). As a result, the third comparator 145 may have an opposite logic value to the signal V3. For example, when the signal V3 is high, the output of the third comparator 145 may be low, and when the signal V3 is low, the output of the third comparator 145 may be high.

The signal V3 may be applied to a D input terminal D of the flip-flop 146, and the output of the third comparator 145 may be applied to a clock terminal CK of the flip-flop 146. As shown in FIG. 4, when the signal V3 is changed from high to low, the input signal of the clock terminal CK of the flip-flop 146 may be converted from low to high. The signal V3 at the rising edge of an input signal to the clock terminal CK of the flip-flop 146 is already low. Hence, output Q of the flip-flop 146 becomes low.

When the AC power is applied in this way, the PFC controller 140 includes the flip-flop 146 which may output a control signal for controlling the PFC circuit 120 to be turned on or off according to the AC power.

In another example, the input power may be DC power. When the DC power is applied, even though the DC power is applied to an AC cord (AC inlet) in an arbitrary direction, as shown in FIG. 5, the DC power continues to be conducted only to one direction of the diode bridge 110 unlike the AC power. With this, the PFC controller 140 does not generate a clock signal.

For example, the first voltage $V_{BD1}$ of the diode bridge 110 may be high and the second voltage $V_{BD2}$ may be low. The V1 signal and the V2 signal respectively output from the first comparator 142 and the second comparator 143 may have the same logic values as the first voltage $V_{BD1}$ and the second voltage $V_{BD2}$, i.e., the signals V1 and V2 may be high. When the V1 signal and V2 signal are applied to the OR gate 144, the V3 signal is generated to be high. When the V3 signal is applied to the flip-flop 146, no clock signal is generated. The flip-flop 146 generates a PFC off signal based on the clock signal.

In another example, the first voltage $V_{BD1}$ of the diode bridge 110 may be low and the second voltage $V_{BD2}$ may be high. The V1 signal and the V2 signal respectively output from the first comparator 142 and the second comparator 143 may be the same as the first voltage $V_{BD1}$ and the second voltage $V_{BD2}$ of the diode bridge 110. When the V1 signal and V2 signal are applied to the OR gate 144, the signal V3 is generated to be high. When the V3 is applied to the flip-flop 146, no clock signal is generated. The flip-flop 146 generates a PFC off signal based on the clock signal.

Figure 6:
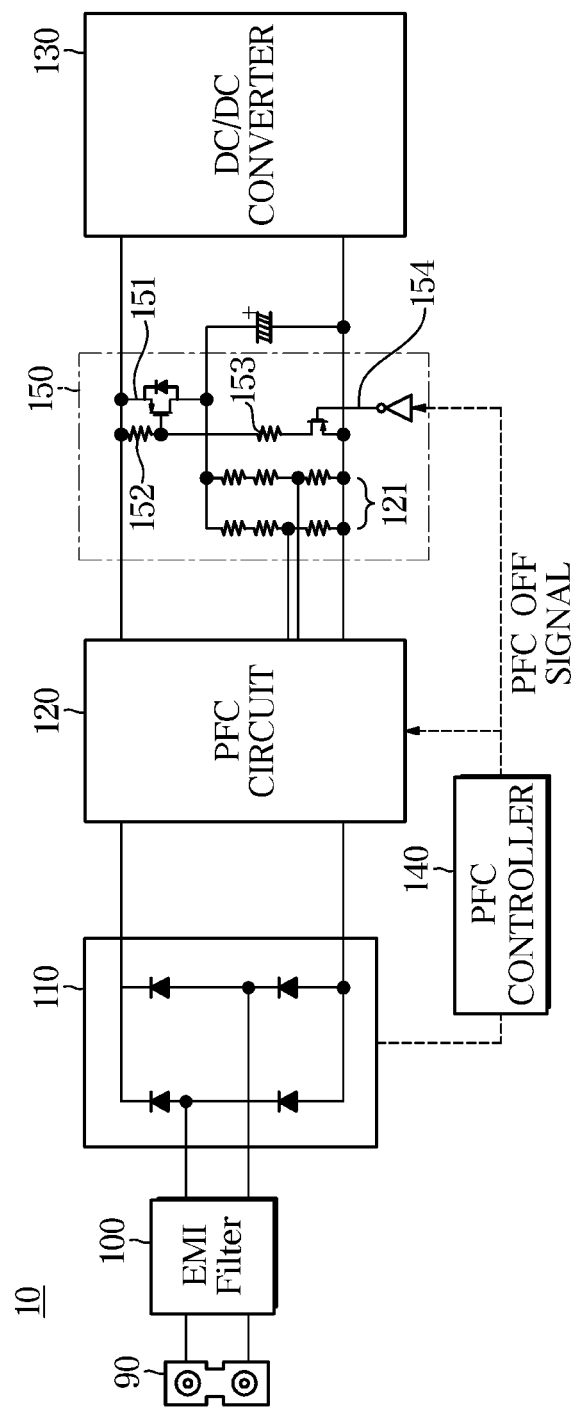
FIG. 6 is a diagram for describing an example of a standby power reducer.

FIG. 6 is a diagram for describing an example of a standby power reducer.

Referring to FIG. 6, the standby power reducer 150 according to an embodiment may include a switch 151, at least two resistors 152 and 153 and a NOT gate 154.

When the PFC controller 140 generates a PFC off signal to turn off the PFC circuit 120, the standby power reducer 150 eliminates impedance contained in the resistor 121 of the PFC circuit 120. For this, the standby power reducer 150 may include the switch 151, which may be provided as a semiconductor device for example. In another example, the switch 151 may be provided as a relay.

The NOT gate 154 may operate as a buffer when the PFC controller 140 is provided as an analog circuit and sends a PFC off signal. When the PFC controller 140 is provided as an MCU, the NOT gate 154 may be omitted.

The PFC circuit 120 may include various components such as an output voltage sensing resistor, an over-voltage protection (OVP) circuit, a link capacitor, etc. The impedance contained in the aforementioned configuration is shown with multiple resistors 121 in FIG. 6. Hence, the standby power reducer 150 is not always limited to the circuit as in FIG. 6, but may be implemented with various circuits including the switch 151 as long as the circuits eliminate the impedance based on the PFC off signal.

Figure 7:
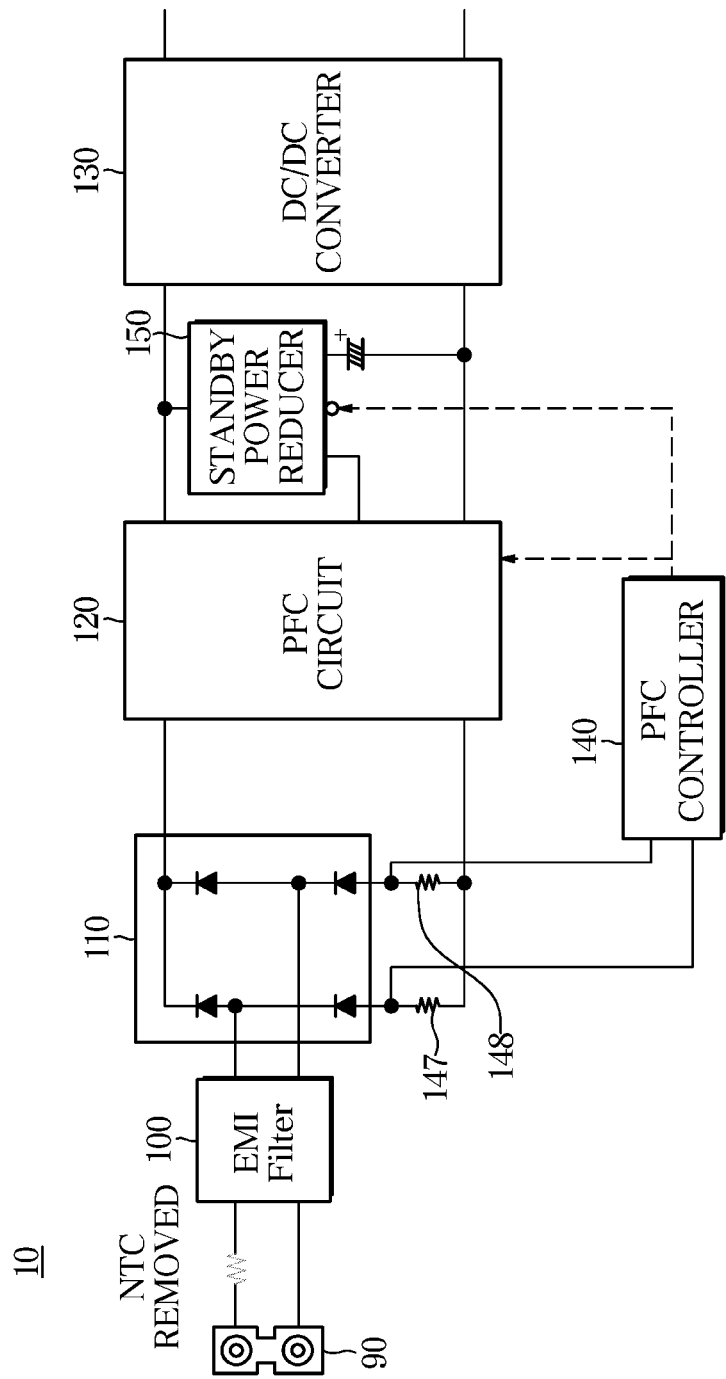
FIG. 7 is a diagram for describing an embodiment of a PFC controller through current sensing.

FIG. 7 is a diagram for describing an embodiment of a PFC controller through current sensing.

Similar to what is shown in the previous drawings, when the DC power is applied to the power receiver 10, one of the two bridges of the diode bridge 110 does not conduct current. Accordingly, the PFC controller 140 connected to the diode bridge 110 may determine whether the input power is AC power or DC power through the current sensing.

The current sensing may be implemented by a simple sensor resistor. Referring to FIG. 7, the PFC controller 140 according to an embodiment may include at least two negative temperature coefficient of resistance (NTC) sensors (sensing resistors) 147 and 148. The NTC sensors 147 and 148 may be arranged between the diode bridge 110 and the PFC controller 140, and the PFC controller 140 may determine a type of the input power by comparing detection results from the at least two NTC sensors 147 and 148.

To determine the input power through the current sensing, detecting only a flow of current is sufficient. That is, as the PFC controller 140 does not need to detect an accurate current value and the NTC sensors 147 and 148 are provided, a NTC resistor may not be provided between an input connector 90 and the EMI filter 100. In other words, the existing NTC resistor between an input connector 90 and the EMI filter 100 may be removed. Accordingly, the power receiver 10 may have an inexpensive manufacturing cost according to the embodiment of FIG. 7.

Figure 8:
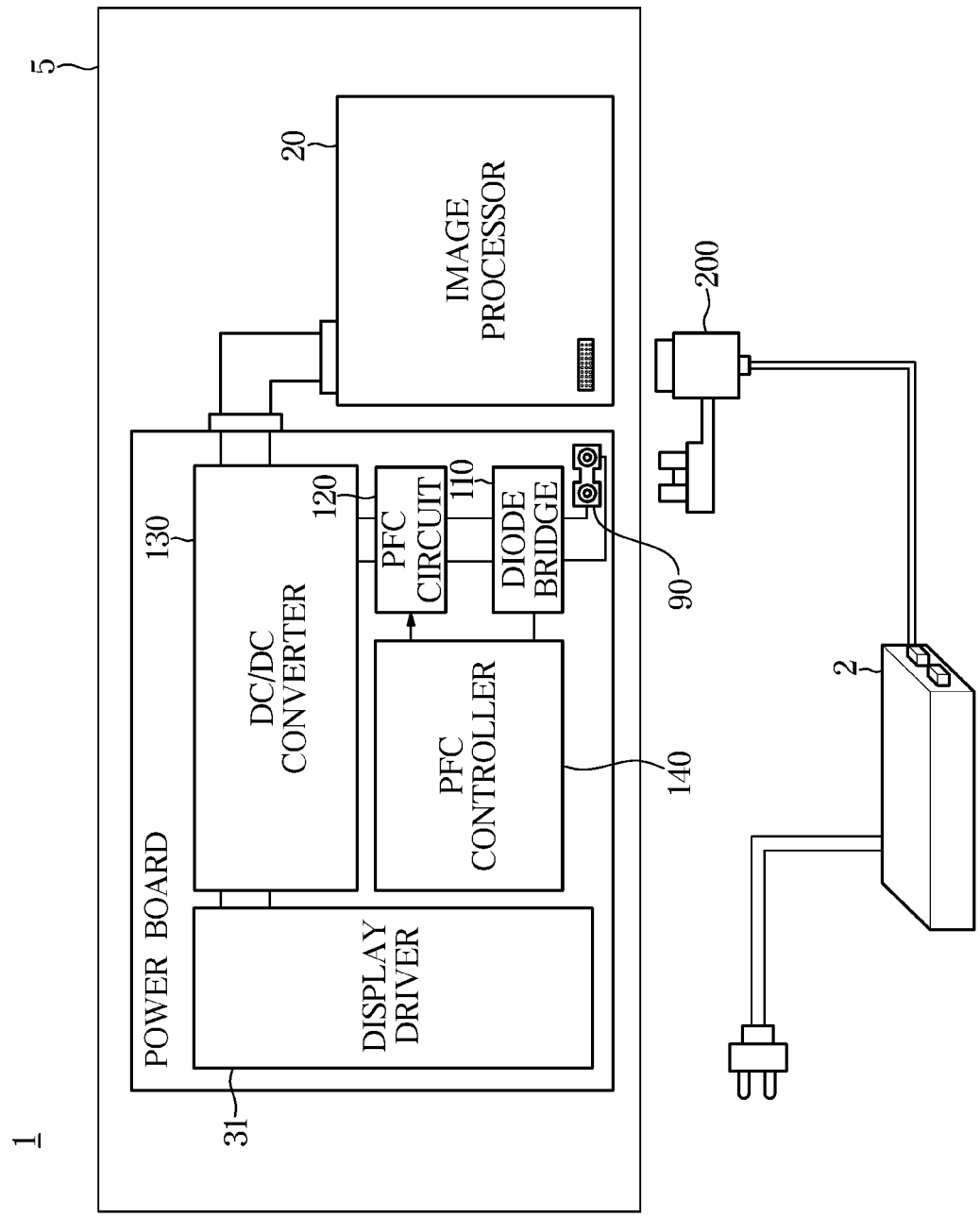
FIG. 8 is a diagram for describing an embodiment of a display device including a source device.

FIG. 8 is a diagram for describing an embodiment of a display device including a source device.

Referring to FIG. 8, the display device 1 in an example may include the source device 2 for transmitting input power and image signals and a main body 5 for displaying received images.

In an embodiment as shown in FIG. 8, the display device 1 may include a display driver 31 for operating the power receiver 10 and the display 30 on a power board. The DC/DC converter 130 arranged on the power board supplies DC power with an adjusted magnitude to the display driver 31 or the image processor 20. The image processor 20 may process the image signal received from the source device 2, and the display driver 31 may operate the display panel for displaying the processed image signal at the power supplied.

The source device 2 may be a set-top box or a game console for collecting image signals from the outside or storing image signals, and sending the image signals to the display device 1. Furthermore, the source device 2 may be a switched-mode power supply (SMPS) including a switching regulator for efficiently switching various types of external power, such as a wall-mounted power source, a battery solar-cell panel, etc.

Specifically, the set-top box refers to a digital satellite broadcasting receiver, allowing the display device 1 to receive digital television (TV) broadcast provided by a broadcasting operator even with an analog TV. Moreover, the set-top box may include all the essential equipment to realize interactive TVs or video on demand (VOD).

The game console refers to an interactive entertainment electronic device using a display signal such as composite video, high definition multimedia interface (HDMI), or the like, which is used in the display device 1. For example, the game console may include Xbox™, or PlayStation™.

The source device shown in FIG. 8 represents a power supply device. The power supply device may be classified into an embodiment that converts external power to DC power and supply the DC power to the main body 5 and another embodiment that supplies full-wave rectified AC power.

The source device 2 provided as a power supply device may transmit an image signal to the image processor 20 and deliver input power to the input connector 90. The source device 2 may be connected to the main body 5 via a cable including a switching connector 200 so as to send the image signal and the input power to the main body 5.

Figure 9:
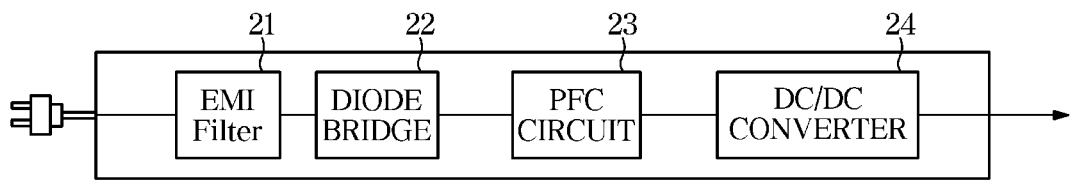
FIGS. 9 and 10 are diagrams for describing different embodiments of a source device provided as a power supply device.
Figure 10:
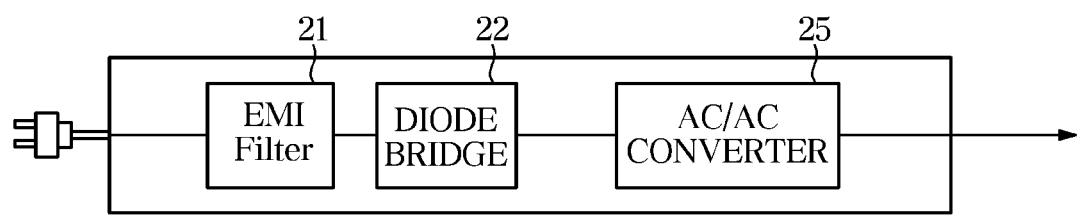

FIGS. 9 and 10 are diagrams for describing different embodiments of a source device provided as a power supply device.

As described above in connection with FIG. 8, the source device 2 provided as the power supply device may transmit DC power as the input power to the power receiver 10.

Referring to FIG. 9, a source device 2a for supplying DC power may include an EMI filter 21, a diode bridge 22, a PFC circuit 23 and a DC/DC converter 24. That is, the source device 2a for supplying DC power may already be equipped with the PFC circuit 23. As redundantly operating the PFC circuit 120 arranged on the power board is a waste of power, the PFC controller 140 may generate a signal to turn off the PFC circuit 120.

Referring to FIG. 10, a source device 2b for supplying full-wave rectified AC power may include the EMI filter 21, the diode bridge 22, and an AC/AC converter 25. Specifically, electric waves of the AC power that have passed the diode bridge 22 and the AC/AC converter 25 are rectified.

The source device 2b does not include the PFC circuit 23, so the PFC circuit 120 equipped in the main body needs to be operated. The PFC controller 140 may generate a PFC ON signal by recognizing even the full-wave rectified AC power transmitted by the source device 2b as AC power.

Figure 11:
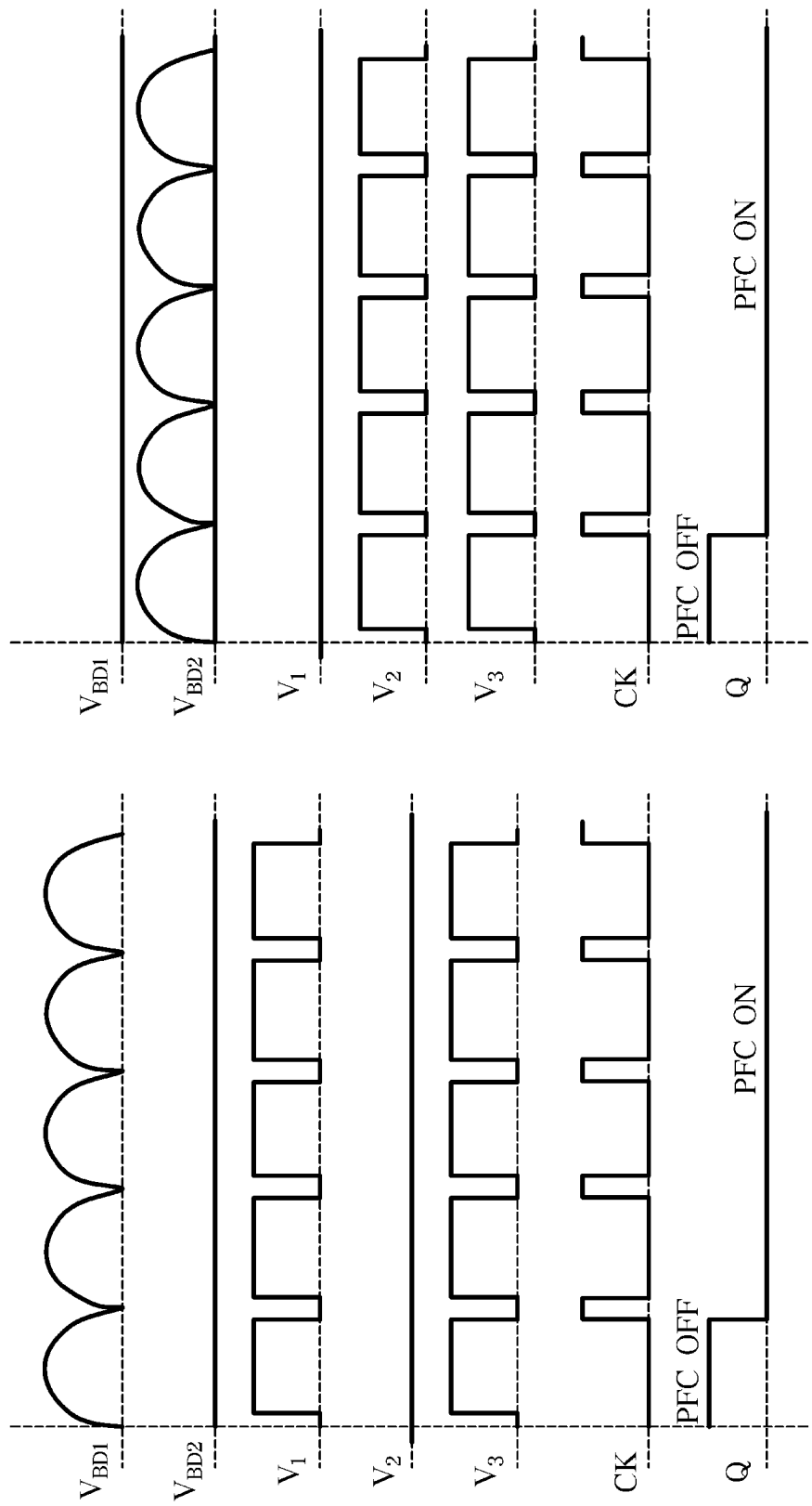
FIG. 11 is a diagram for describing operations of a PFC controller according to full-wave rectified AC power.

FIG. 11 is a diagram for describing operations of a PFC controller according to full-wave rectified AC power.

As described above in connection with FIG. 10, the input power may be full-wave rectified AC power. When the full-wave rectified AC power $V_{BD1}$ is applied, the first voltage $V_{BD1}$ of the diode bridge 110 has a rectified waveform as in FIG. 11. However, the second voltage $V_{BD2}$ may be low as in FIG. 11. In other words, the PFC controller 140 receives AC/DC power through the diode bridge 110.

On the other hand, the full-wave rectified AC power may pass the diode bridge 110 to have the first voltage $V_{BD1}$ be low and the second voltage $V_{BD2}$ have a rectified waveform.

When this AC/DC power is applied to the first comparator 142 and the second comparator 143, the signals V1 and V2 may be produced in the same form as in FIG. 11. These signals V1 and V2 pass the OR gate 144 and have square waves such as the signal V3. With the square waves, the PFC controller 140 generates a clock signal and control a D flip-flop signal based on the clock signal to turn on the PFC circuit 120. In other words, in an embodiment, the PFC controller 140 operates the PFC circuit 120 even at the AC/DC power.

Figure 12:
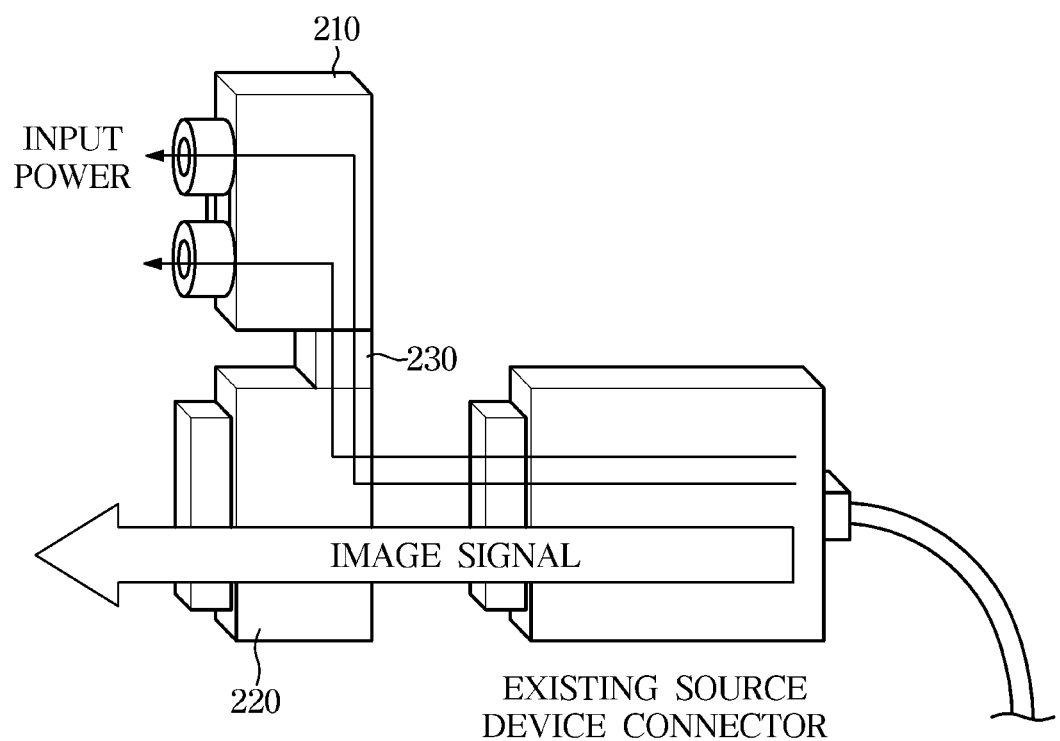
FIG. 12 is a diagram for describing a switching connector, according to an embodiment.

FIG. 12 is a diagram for describing a switching connector, according to an embodiment, and FIG. 13A, FIG. 13B, FIG. 14A, FIG. 14B, FIG. 15A and FIG. 15B are diagrams for describing various embodiments in which a switching connector may be implemented. FIGS. 12 to 15 will now be described collectively to avoid overlapping explanation.

As described above in connection with the previous drawings, the power receiver 10 as disclosed is able to identify not only DC power but also AC power or AC/DC power. Hence, to be connected to the source device 2 for supplying AC power or full-wave rectified AC power, the switching connector 200 may be required for an existing source device connector to be fastened to the AC cord.

Specifically, the switching connector 200 may include a first fastener 210 provided in the form of an AC cord to be inserted to the input connector 90, a second fastener 220 provided to send image data to the image processor 20, and a connector 230 connecting between the first fastener 210 and the second fastener 220.

Input power is sent to the main body 5 through the first fastener 210, and an image signal is sent to the main body 5 through the second fastener 220. Furthermore, the second fastener 220 may be formed for an existing source device connector to be inserted thereto.

With this, the power receiver 10 as disclosed may receive the input power from the source device 2 and receive the image signal at the same time.

The switching connector 200 as disclosed may be provided in various forms.

Figure 13A:
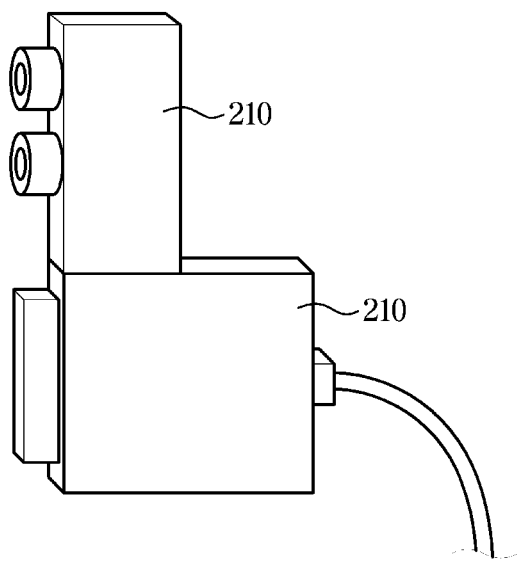
Figure 13B:
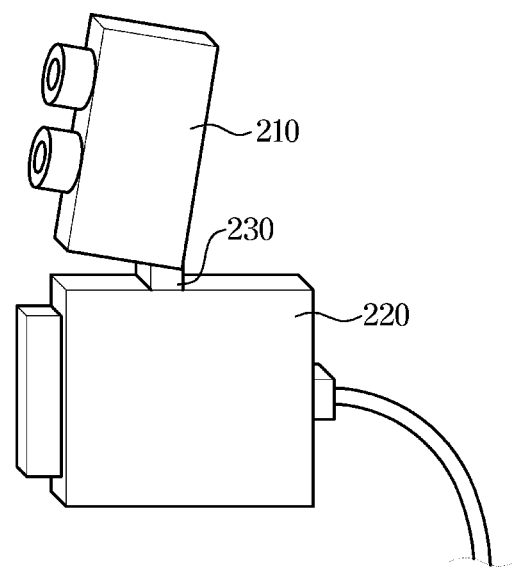

Referring to FIG. 13A and FIG. 13B, for example, the switching connector 200 may have a structure in which the connector 230 may be inserted to the first fastener 210, and accordingly, the first fastener 210 may come into contact with the second fastener 220. The first fastener 210 may be separated from the second fastener 220 by external force, and the first fastener 210 may rotate on the connector 230.

Referring to FIG. 14A and FIG. 14B, in another example, the switching connector 200 may be equipped with at least two connectors 231 and 232, and as in FIG. 13A and FIG. 13B, the first fastener 210 and the second fastener 220 may be separated from each other by external force.

Referring to FIG. 15A and FIG. 15B, the connector 230 may be formed to have a length longer than the connectors of FIG. 13A, FIG. 13B, FIG. 14A and FIG. 14B. In FIG. 15A and FIG. 15B, the first fastener 210 may be arranged to be at a distance from the second fastener 220, and the distance may further extend by the connector 230.

The switching connector 200 may have various forms other than the forms shown in FIG. 13A, FIG. 13B, FIG. 14A, FIG. 14B, FIG. 15A and FIG. 15B.

FIG. 16 is a flowchart of a method of controlling a display device in the disclosure.

Referring to FIG. 16, the display device 1 cancels noise in the input power, in 300.

Specifically, the EMI filter 100 of the power receiver 10 cancels noise in the input power, and the input power with the noise canceled is sent to the diode bridge 110.

The display device 1 rectifies the input power in 310.

Specifically, the diode bridge 110 of the power receiver 10 rectifies the input power. According to a type of the input power, the diode bridge 110 may rectify AC power, DC power or AC/DC power.

The display device 1 determines a type of the rectified input power in 320.

Specifically, the PFC controller 140 of the power receiver 10 may determine the type of the input power. The PFC controller 140 is provided as an MCU or an analog circuit to generate an on or off signal to the PFC circuit 120. The PFC controller 140 may perform the following operations based on types of the input power.

When the input power is AC power (yes in 330), the display device 1 turns on the PFC circuit 120, in 331. The PFC circuit 120 controls a power factor of the rectified AC power in 332, and sends the result to the DC/DC converter 130.

When the input power is not AC power (no in 330), the display device 1 determines whether the input power is AC/DC power or DC power. When the input power is AC/DC power (yes in 340), the display device 1 turns on the PFC circuit 120, in 341. The PFC circuit 120 controls a power factor of the rectified AC power in 342, and sends the result to the DC/DC converter 130.

When the input power is not AC/DC power (no in 340), the display device 1 determines whether the input power is DC power in 350. The display device 1 turns off the PFC circuit 120 in 351, and operates the standby power reducer 150 to reduce extra power consumed by the PFC circuit 120 in a standby mode in 352.

Accordingly, the display device 1 may turn off the PFC circuit 120 when DC power is supplied through the input connector 90, thereby reducing power consumption and improving operational efficiency.

While various embodiments have been illustrated and described, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. A display device comprising:
    a diode bridge configured to rectify input power;
    a power factor correction (PFC) circuit configured to control a power factor of the input power rectified by the diode bridge;
    a direct current (DC)/DC converter configured to change voltage of the input power received through the PFC circuit; and
    a PFC controller connected to the diode bridge and configured to selectively turn on or off the PFC circuit based on terminal voltages of diodes included in the diode bridge,
    wherein the PFC controller is further configured to:
        identify that the input power is alternating current (AC) power based on a change in the terminal voltages of the diodes included in the diode bridge, and
        identify that the input power is DC power in response to no change in the terminal voltages of the diodes included in the diode bridge.

2. The display device of claim 1, wherein the PFC controller comprises:
    first and second comparators configured to compare the terminal voltages of the diodes included in the diode bridge with a first reference voltage;
    an OR gate configured to output a result of a logical OR operation of outputs of the first and second comparators; and
    a flip-flop configured to output a signal to selectively turn on or off the PFC circuit based on a change in the result output by the OR gate.

3. The display device of claim 2, wherein the PFC controller further comprises a third comparator configured to generate a clock signal based on the input power based on the change in the result output by the OR gate, and
    wherein the flip-flop is further configured to output the signal to turn on or off the PFC circuit based on the clock signal.

4. The display device of claim 1, further comprising at least two negative temperature coefficient of resistance (NTC) sensors provided between the diode bridge and the PFC controller.

5. The display device of claim 4, wherein the PFC controller is further configured to identify a type of the input power based on a detection value of the NTC sensors.

6. The display device of claim 1, wherein the input power comprises at least one of the AC power, the DC power, or AC/DC power, and
    wherein the PFC controller is further configured to turn on the PFC circuit based on at least one of the AC power or the AC/DC power.

7. The display device of claim 6, wherein the PFC controller is further configured to turn off the PFC circuit based on the DC power.

8. The display device of claim 1, further comprising a standby power reducer including a switch configured to eliminate impedance contained in the PFC circuit, and to be controlled by the PFC controller.

9. The display device of claim 8, wherein the PFC controller is further configured to generate a signal to turn off the PFC circuit and to operate the standby power reducer based on the signal.

10. A method of controlling a display device including a diode bridge and a power factor correction (PFC) circuit for controlling a power factor of input power rectified by the diode bridge, the method comprising:
    rectifying, by the diode bridge, the input power;
    identifying a type of the input power rectified by the diode bridge; and
    controlling the PFC circuit to be selectively turned on or off based on the type of the input power,
    wherein identifying the type of the input power rectified by the diode bridge comprises:
        identifying that the input power is alternating current (AC) power based on a change in terminal voltages of diodes included in the diode bridge, and
        identifying that the input power is DC power in response to no change in the terminal voltages of the diodes included in the diode bridge.

11. The method of claim 10, wherein the controlling the PFC circuit comprises turning on the PFC circuit based on the input power including at least one of the AC power or AC/DC power.

12. The method of claim 10, wherein the controlling the PFC circuit comprises turning off the PFC circuit based on the input power corresponding to the DC power.

13. The method of claim 10, wherein the display device further includes a standby power reducer including a switch configure to eliminate impedance contained in the PFC circuit.

14. The method of claim 13, wherein the controlling the PFC circuit comprises controlling the standby power reducer based on the type of the input power.

15. The method of claim 13, wherein the controlling the PFC circuit further comprises generating a signal to turn off the PFC circuit and operating the standby power reducer based on the signal.

16. The method of claim 10, wherein the identifying the type of the input power comprises identifying the type of the input power based on a detection value of at least two negative temperature coefficient of resistance (NTC) sensors provided between the diode bridge and a PFC controller.

* * * * *